US010404486B2

(12) United States Patent
Hirsch

(10) Patent No.: US 10,404,486 B2
(45) Date of Patent: Sep. 3, 2019

(54) CONNECTING OPERATING STATES OF A MOTOR VEHICLE AND A VEHICLE-EXTERNAL DEVICE

(71) Applicant: AUDI AG, Ingolstadt (DE)

(72) Inventor: Manuel Hirsch, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/755,929

(22) PCT Filed: Sep. 10, 2016

(86) PCT No.: PCT/EP2016/001528
§ 371 (c)(1),
(2) Date: Feb. 27, 2018

(87) PCT Pub. No.: WO2017/054905
PCT Pub. Date: Apr. 6, 2017

(65) Prior Publication Data
US 2018/0337801 A1 Nov. 22, 2018

(30) Foreign Application Priority Data

Oct. 1, 2015 (DE) .................. 10 2015 012 723

(51) Int. Cl.
H04W 4/44 (2018.01)
H04L 12/28 (2006.01)
(Continued)

(52) U.S. Cl.
CPC ..... H04L 12/2825 (2013.01); B60H 1/00657 (2013.01); B60R 16/037 (2013.01);
(Continued)

(58) Field of Classification Search
CPC ......... H04L 12/2825; H04L 2012/2841; H04L 2012/40273; G05B 15/02; H04W 4/44; B60R 16/037
See application file for complete search history.

(56) References Cited

U.S. PATENT DOCUMENTS 8,730,033 B2    5/2014  Yarnold et al.
2007/0144723 A1* 6/2007 Aubertin ............ B60H 1/00642
                                                  165/202
(Continued)

FOREIGN PATENT DOCUMENTS

CN    103080985 A    5/2013
CN    103229119 A    7/2013
(Continued)

OTHER PUBLICATIONS

German Office Action dated Jul. 4, 2016 from German Patent Application No. 10 2015 012 723.3, 10 pages.
(Continued)

Primary Examiner — Robert E Fennema
Assistant Examiner — Marzia T Monty
(74) Attorney, Agent, or Firm — Staas & Halsey LLP

(57) ABSTRACT

An operating state of a motor vehicle is connected to a respective operating state of at least one vehicle-external device via a server device. The motor vehicle makes available event data via an event channel and/or receives triggering data via a triggering channel, and the at least one vehicle-external device respectively makes available event data via an event channel and/or receives triggering data via a triggering channel. As a result at least one channel pair which connects the motor vehicle to in one of the at least one vehicle-external device is made available, and at least one linking rule is defined by an input device, each linking rule specifying respectively predetermined triggering data for the channel pair which is made available, the triggering data
(Continued)

being output via the triggering channel of the channel pair if predetermined event data is received via the event channel of the channel pair.

15 Claims, 3 Drawing Sheets

(51) Int. Cl.
*B60R 16/037* (2006.01)
*G05B 15/02* (2006.01)
*B60H 1/00* (2006.01)
*H04L 12/40* (2006.01)

(52) U.S. Cl.
CPC .............. *G05B 15/02* (2013.01); *H04W 4/44* (2018.02); *H04L 2012/2841* (2013.01); *H04L 2012/40273* (2013.01)

(56) References Cited

U.S. PATENT DOCUMENTS

| | | | |
|---|---|---|---|
| 2012/0234815 A1 | 9/2012 | Willey et al. | |
| 2013/0303131 A1 | 11/2013 | Sadhu | |
| 2014/0309789 A1* | 10/2014 | Ricci | B60Q 1/00 700/276 |
| 2015/0187209 A1 | 7/2015 | Brandt | |
| 2017/0028935 A1* | 2/2017 | Dutta | B60R 11/04 |

FOREIGN PATENT DOCUMENTS

| | | |
|---|---|---|
| DE | 10 2004 014 262 A1 | 10/2005 |
| DE | 10 2006 024 634 A1 | 11/2007 |
| DE | 10 2010 009 760 A1 | 9/2011 |
| DE | 10 2011 106 357 A1 | 8/2012 |
| DE | 10 2013 220 208 A1 | 4/2015 |
| DE | 10 2015 103 263 A1 | 9/2015 |
| DE | 10 2015 012 723.3 | 10/2015 |
| DE | 10 2015 012 723 B3 | 1/2017 |
| WO | PCT/EP2016/001528 | 9/2016 |

OTHER PUBLICATIONS

International Search Report dated Dec. 14, 2016 from International Patent Application No. PCT/EP2016/001528, 2 pages.
Chinese Office Action dated Sep. 4, 2018 from Chinese Patent Application No. 201680055518.2, with English language translation of summary of Examiner's comments, (6 pages total).
Translation of International Preliminary Report on Patentability dated Apr. 5, 2018 from International Patent Application No. PCT/EP2016/001528, 7 pages.

* cited by examiner

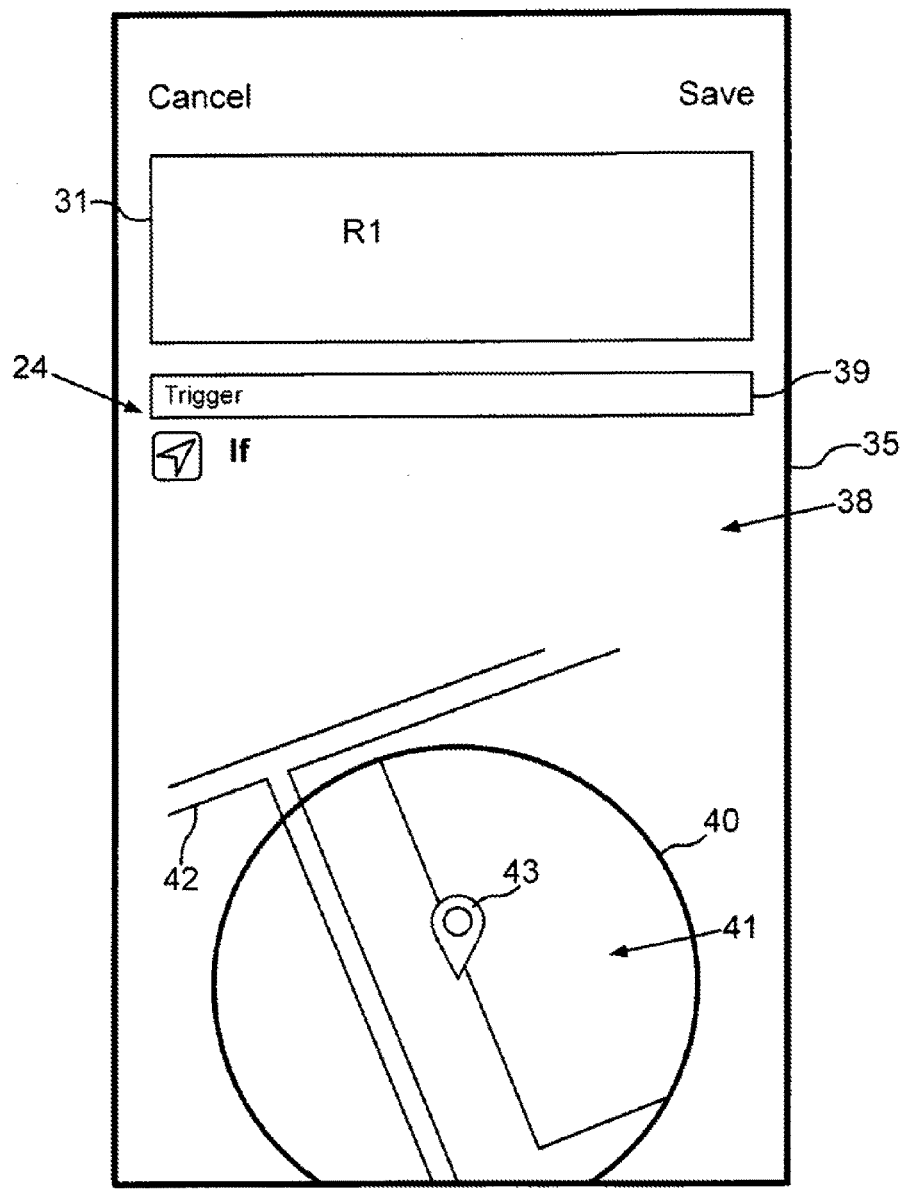

CONNECTING OPERATING STATES OF A MOTOR VEHICLE AND A VEHICLE-EXTERNAL DEVICE

CROSS REFERENCE TO RELATED APPLICATIONS

This application is a U.S. national stage of International Application No. PCT/EP2016/001528, filed on Sep. 10, 2016. The International Application claims the priority benefit of German Application No. 10 2015 012 723.3 filed on Oct. 1, 2015. Both the International Application and the German Application are incorporated by reference herein in their entirety.

BACKGROUND

Described herein is a method for coupling an operating state of a motor vehicle to a respective operating state of at least one vehicle-external apparatus. The method can be performed by a server device that may be configured as a server for the Internet, for example. Also described herein is the server device and a motor vehicle that can be coupled to the at least one vehicle-external apparatus via the server device.

In a motor vehicle, the knowledge of vehicle-external states of the surroundings is extremely dependent on sensors around the motor vehicle capturing these states. This is possible only during driving and only in a limited sphere, however. In a motor vehicle, it is not possible today, for example, to tell what temperature the driver currently feels when he is still in his living room. Therefore, it is also not possible to react thereto within the motor vehicle. Changing the operating state of the motor vehicle, for example adapting the air conditioning to suit the temperature the driver currently feels, always requires a report or a trigger command to be explicitly sent to the motor vehicle. To this end, a remote control may be provided, for example, by which the vehicle heater of the motor vehicle can be switched on by the driver.

In the other direction too, however, that is to say from the motor vehicle, there is no automated integration into the surroundings. This can be quite useful, however, in order to notify the family when the driver is on his way home in the motor vehicle, for example. A vehicle cannot change a state of an appliance or an apparatus outside the motor vehicle on the basis of its own operating state, for example its own current geoposition, however.

The driver thus normally needs to actively instigate an independent action in order to control the operating state of the motor vehicle. The other way around, he normally also needs to actively communicate a desire to transmit a message from the motor vehicle to a vehicle-external apparatus.

German Patent Application Publication 10 2004 014 262 A1 describes an alarm clock that automatically sets the wakeup time on the basis of whether or not windows in the motor vehicle are frozen.

German Patent Application Publication 10 2011 106 357 A1 describes a method in which an operating state of the motor vehicle is set on the basis of calendar data from a personal calendar of a user. The calendar data are received via a radio link.

German Patent Application Publication 10 2010 009 760 A1 describes a motor vehicle that reacts to objects in the surroundings by virtue of the objects each having a transponder provided on them that transmits a piece of type information relating to the object as a radio signal. The radio signal is then received by the motor vehicle and used to configure the motor vehicle.

SUMMARY

An aspect of the disclosure is based on automating interaction between a motor vehicle and surroundings.

Described herein is a method that couples an operating state of the motor vehicle to a respective operating state of at least one vehicle-external apparatus. The method is performed by a server device. The server device is in this case coupled to the motor vehicle via at least one event channel and/or at least one trigger channel. Moreover, the server device is respectively coupled to each vehicle-external apparatus likewise via at least one event channel and/or at least one trigger channel. A channel (event channel, trigger channel) is intended to be understood in each case to refer to, in particular, a transmission path for the respective data within a radio link. By way of example, the channel may be realized by using a time-division multiplexing method in a manner known per se.

The motor vehicle uses the at least one event channel thereof to provide event data for describing the current operating state of the motor vehicle in the server device and/or uses the at least one trigger channel of the motor vehicle to receive trigger data for setting a desired operating state of the motor vehicle from the server device. Each of the at least one vehicle-external apparatuses respectively uses the at least one event channel thereof to provide event data for describing the current operating state of the apparatus in the server device and/or uses the at least one trigger channel of the apparatus to receive trigger data for setting a desired operating state of the apparatus from the server device. Each event channel may be provided for one specific event type, that is to say e.g. for signaling a change of state of a predetermined vehicle component. Equally, each trigger channel may be provided for triggering one specific action, that is to say e.g. for setting an operating state of a predetermined vehicle component. All in all, this results in at least one channel pair with an event channel and a trigger channel. A channel pair can thus depict an event channel to the server device from the motor vehicle and a trigger channel from the server device to a vehicle-external apparatus. Conversely, a channel pair can also be routed from a vehicle-external apparatus via an event channel to the server device and from the server device via a trigger channel to the motor vehicle. In other words, the server device uses event channels to collect respective event data for the current operating state of the motor vehicle and/or of the at least one apparatus and uses the respective trigger channel to set the operating state of the motor vehicle and/or of the at least one vehicle-external apparatus. Therefore, a channel pair is intended to be understood to refer to a pair of channels by which the motor vehicle is coupled to a respective one of the at least one apparatuses. A respective channel pair can be produced per event type, i.e. per event channel. A channel pair can also include multiple event channels and/or trigger channels.

Each channel pair can now be used flexibly. To this end, an input device takes a user input as a basis for stipulating at least one linking rule. Each linking rule respectively specifies predetermined trigger data for a provided channel pair, which trigger data are transmitted via the trigger channel of the channel pair if predetermined event data are received via the event channel of the channel pair. The trigger data thus describe a reaction that is triggered on the basis of predetermined event data. In this case, the user can select or stipulate this reaction by selecting or stipulating the applicable linking rule. The server device then couples the operating state of the motor vehicle and the respective operating state of the at least one apparatus according to the at least one stipulated linking rule. Each linking rule therefore depicts a recipe for how the motor vehicle and the at least one vehicle-external apparatus are supposed to react to one another. This can be stipulated or changed or set by the user using the input device. A linking rule may be realized as an IF-THEN rule, for example. The condition (IF) then describes the event data. The consequence (THEN) describes the trigger data.

The method described herein results in the advantage that the coupling of the operating states of the motor vehicle, on the one hand, and of the at least one vehicle-external apparatus, on the other hand, is automated on the basis of stipulation of the at least one linking rule. In other words, a user, after the stipulation of the at least one linking rule, needs to perform no further operator control steps in order for the motor vehicle and the at least one vehicle-external apparatus to react to one another or to interact with one another. This is then performed by the server device. In this case, the operating behavior of the server device is freely definable or stipulable by the user by using the at least one linking rule. It is particularly advantageous in this case that further events and actions can be added on a motor vehicle even in retrospect and the events and actions can be linked to produce new instances of application. By adding a new event, a new event channel can then be formed or an existing channel pair can be extended. Equally, a trigger channel can be produced for each new action.

The method described herein also includes optional developments, the features of which result in additional advantages. In describing the latter, it is respectively assumed that the motor vehicle and the at least one apparatus provide the respectively mentioned event channels and trigger channels.

According to one development, the at least one apparatus includes a building control device of a building. In other words, this apparatus depicts a building automation installation. By way of example, the building may be a residential house or an industrial building or an office building. Accordingly, the at least one channel pair couples the motor vehicle to the building control device of the building via at least one linking rule. This results in the advantage that an operating state of the building and/or a change of state of the building affects the operating state of the motor vehicle via the at least one linking rule. Conversely, an operating state and/or a change of state of the motor vehicle affects the building via the at least one linking rule.

Thus, in this regard, one development provides for one of the at least one linking rules stipulated to be that the event channel of the motor vehicle is used to receive a navigation destination of a navigation appliance of the motor vehicle. The trigger channel of the building control device is used to transmit a switching command for setting an operating profile for a vacant state to the building control device if the navigation destination is further away from the building than a predetermined minimum distance. In this case, the operating profile for the vacant state stipulates that the building is operated by the building control device in the manner envisioned when there is no person in the building. In particular, an energy consumption is minimized. This operating profile is then set in automated fashion if, on the basis of the navigation destination, it is detected that a user will move further away from the building than a predetermined minimum distance. This allows energy saving effects to be attained for the building. The minimum distance may be 200 km or 250 km, for example.

One development provides for one of the at least one linking rules stipulated to be that the event channel of the building control device is used to receive a current desired temperature of a heating installation of the building. The desired temperature is transmitted to the motor vehicle via the trigger channel of the motor vehicle as a target temperature of an air conditioning installation of the motor vehicle. This results in the advantage that the user of the motor vehicle, on getting into the motor vehicle, already finds the same target temperature set there as he also set as the desired temperature in the heating installation of the building. The user thus does not need to set this desired temperature a second time.

The motor vehicle can be coupled not only to a building control device, however. One development provides for the at least one apparatus to include a monitoring device for at least one body function of a user of the motor vehicle. The monitoring device may be provided by a smart watch or a pulse measuring device or a blood pressure measuring device, for example. One of the at least one linking rules stipulated is that the event channel of the monitoring device is used to receive body state data. The trigger channel of the motor vehicle is used to transmit an actuation command to the motor vehicle on the basis of the received body state data. This results in the advantage that the motor vehicle is set or configured on the basis of the current body state of the user. By way of example, the body state data can signal a wakeup time of the user. The actuation command transmitted can then be a starting time of a vehicle heater of the motor vehicle, for example. By way of example, the linking rule may thus stipulate the rule or the recipe that, after the user wakes up, the vehicle heater is started after a predetermined period, for example after 50 minutes.

According to one development, the at least one apparatus includes a message reception device. The message reception device may be realized by a smart phone or a tablet PC or a personal computer, for example. One of the at least one linking rules stipulated is that the event channel of the motor vehicle is used to receive a vehicle location. The trigger channel of the message reception device is used to transmit a location notification containing the location to the message reception device if the motor vehicle is at the vehicle location within a predetermined interval of time. This advantageously reminds the user of the motor vehicle that the motor vehicle is still at the vehicle location within the interval of time. If the motor vehicle is not yet in the garage, for example, after a predetermined time of day, for example, then the user is reminded of this by the location notification. The user can then drive the motor vehicle to the garage, for example.

According to one development, the at least one apparatus includes a communication device having a locating sensor. The communication device may be a smart phone having a GPS sensor (GPS—Global Positioning System), for example. One of the at least one linking rules stipulated is that the event channel of the communication device is used to receive a message and the trigger channel of the motor vehicle is used to transmit a location of the communication device to the motor vehicle as a navigation destination if the message is received within a predetermined interval of time and/or the communication device is associated with a predetermined person. By way of example, the linking rule stipulated may thus be that the communication device is used to receive a message from a predetermined person and then the location of the person using the communication device is then set in the navigation appliance of the motor vehicle in the motor vehicle of the user. There may also be provision for a user of the communication device to receive a message with an enquiry after the location and then for the location to be set in the communication appliance of the motor vehicle of the enquiring person, so that this person can be navigated to the location of the user of the communication device.

One development provides for the at least one vehicle-external apparatus to include an appliance control device of an appliance and for one of the at least one linking rules stipulated to be that the event channel of the motor vehicle is used to receive a boundary crossing message. The boundary crossing message indicates that a predetermined area is left or the area is entered. This can be ascertained by using a GPS sensor of the motor vehicle. The trigger channel of the appliance control device is used to transmit an activation signal for an appliance function of the appliance to the appliance control device. This results in the advantage that the appliance function is activated in the appliance as soon as the motor vehicle leaves a predetermined area or enters the area. By way of example, there may be provision for a light from a luminaire in a building to be made green as soon as the motor vehicle leaves a predetermined site. Advantageously, the vehicle-external appliance can therefore be controlled on the basis of a whereabouts of the motor vehicle.

A further embodiment provides for at least one apparatus to include an occasion information device and for one of the at least one linking rules stipulated to be that the event channel of the occasion information device is used to receive an occasion location and the trigger channel of the motor vehicle is used to transmit the occasion location to the motor vehicle as a navigation destination of a navigation appliance of the motor vehicle. This then navigates the motor vehicle to the occasion location without any action from the driver.

As already explained, also described herein is the server device, which is set up to carry out one or more embodiments of the method described herein. The server device may be a server for the Internet, for example. The server device may have, to perform the method, a processor device that may be realized on the basis of a microprocessor or multiple microprocessors, for example.

Finally, also described herein is a motor vehicle. The motor vehicle may include a radio module and a control device. The radio module may be a mobile radio module (GSM, UMTS; LTE) or a WLAN radio module (WLAN—Wireless Local Area Network), for example. The control device may be realized on the basis of a microcontroller or a microprocessor, for example. The control device is set up to use the radio module to provide or set up to a vehicle-external server device at least one event channel for transmitting event data relating to a current operating state and/or at least one trigger channel for receiving trigger data for setting a desired operating state. In the case of the motor vehicle, the event data provided are a vehicle position and/or camera image and/or a navigation destination and/or a boundary crossing message for a predetermined geographical boundary. The trigger data provided may be a target temperature and/or a starting time value and/or a position enquiry and/or a navigation destination and/or boundary description data for a geographical boundary and/or an activation command for a horn and/or a headlamp.

The motor vehicle described herein results in the advantage that this motor vehicle can be coupled to the server device via the at least one event channel and/or the at least one trigger channel and this allows the motor vehicle to be integrated into the surroundings to the effect that the operating state of the motor vehicle and an operating state of at least one vehicle-external apparatus can be coupled to one another via a respective linking rule.

An embodiment of the motor vehicle provides for a navigation device of the motor vehicle to monitor whether the motor vehicle is within a predetermined distance from a predetermined attraction. If the motor vehicle is within the distance from the attraction, an onboard camera of the motor vehicle is used to produce a camera image of the attraction and to transmit image data of the camera image as event data via the event channel. As a result, it is then possible for an appropriate linking rule in the server device to set that, when an attraction is passed through or driven past, a camera image of the attraction is produced in an automated fashion and the camera image is stored in a data memory outside the motor vehicle in accordance with the linking rule. The data memory may be the data memory of a social network, for example, so that the camera image is provided to other users of the social network, that is to say that the camera image is published.

The motor vehicle described herein may be configured as a motor car, for example as an automobile.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a schematic depiction of a user interface of the input device that the user can use to configure a linking rule.

DETAILED DESCRIPTION OF THE PREFERRED EMBODIMENT

Figure 1:
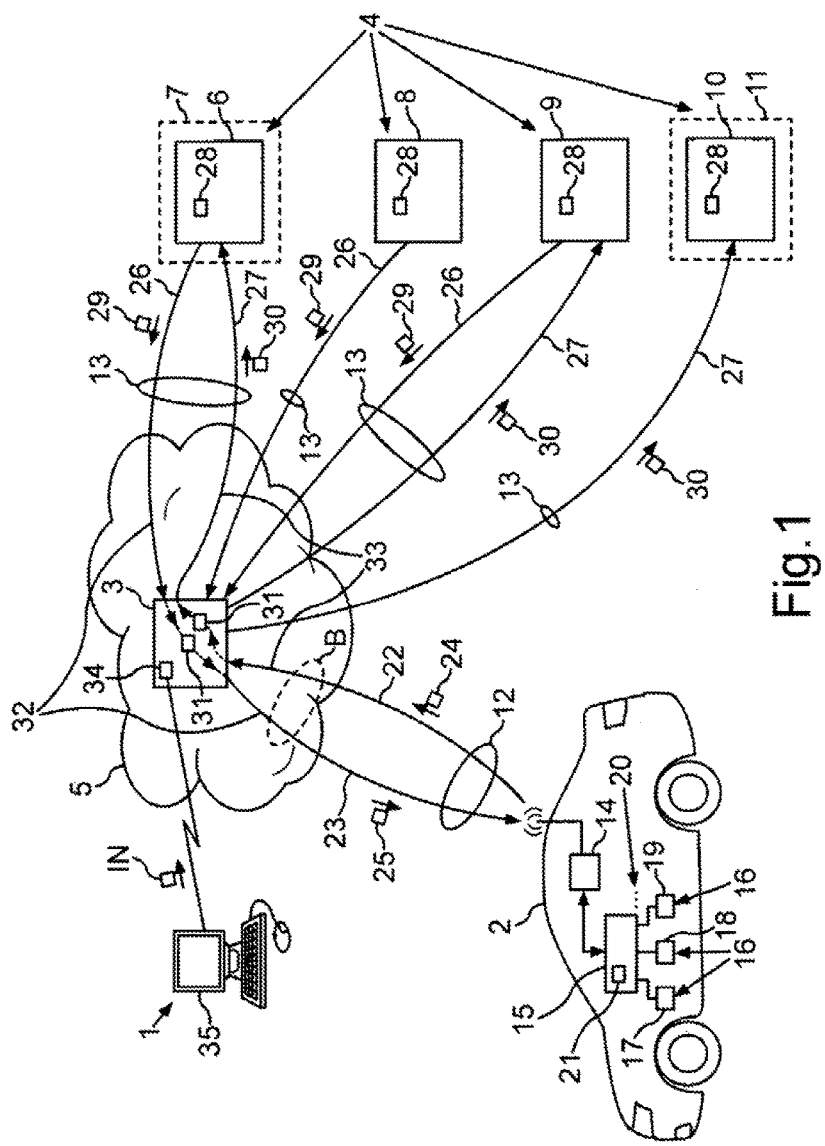
FIG. 1 is a schematic depiction of a system with an embodiment of the server device described herein and an embodiment of the motor vehicle described herein.

Reference will now be made in detail to example embodiments which are illustrated in the accompanying drawings, wherein like reference numerals refer to like elements throughout.

In the one or more exemplary embodiments explained below, the described components in each case represent individual features that should be considered independently of one another and that in each case also develop the disclosure independently of one another and thus should also be regarded individually or in a different combination than that shown. Furthermore, the one or more embodiments described can also be supplemented by further features from among those already described.

FIG. 1 shows a system 1 that couples a motor vehicle 2 to at least one vehicle-external apparatus 4 via a server device 3 to the effect that a respective operating state of the motor vehicle 2 and of the at least one apparatus 4 are coupled. The server device 3 may be a server for the Internet 5, for example.

The vehicle-external apparatuses 4 are outside the motor vehicle 2. By way of example, it can be assumed that the at least one apparatus 4 may be a building control device 6 for a building 7, a monitoring device 8 for a body function of a user (not depicted), a smart phone 9 and/or an appliance control device 10 for an appliance 11. The motor vehicle 2 may be coupled to the control device 3 via a radio link 12. The at least one apparatus 4 may be coupled to the server device 3 via a respective data link 13. The data link 13 may be realized in a wired and/or wireless fashion in a manner known per se in each case.

To provide the radio link 12, the motor vehicle 2 has a radio module 14, which may be a mobile radio module or a WLAN module, for example. The radio link 12 of the radio module 14 couples a control device 15 of the motor vehicle 2 to the server device 3. The control device 15 may be realized on the basis of a controller and/or a processor device of the motor vehicle 2, for example. The control device 15 may have vehicle components 16 coupled to it. One vehicle component 16 may be a navigation appliance 17, for example, one vehicle component 16 may be an air conditioning installation and vehicle heater 18, for example, and one vehicle component 16 may be a camera 19, for example. Further vehicle components are indicated by omission dots 20 ( . . . ). A respective operating state 21 of the vehicle components 16 is monitored and/or controlled by the control device 15. For the sake of clarity, only one vehicle state 21 is depicted, which represents the operating state of a vehicle component 16. Since the operating state 21 relates to a vehicle component 16 of the motor vehicle 1, it is also referred to as an operating state 21 of the motor vehicle 1 here.

The radio link 12 can have multiple channels. In the example illustrated in FIG. 1, the radio link 12 has two channels, namely an outgoing event channel 22 and an incoming trigger channel 23. There may be multiple event channels and/or multiple trigger channels provided. The event channel 22 can be used by the control device 15 to signal the current operating state 21 and/or a change of the operating state 21 as event data 24. The trigger channel 23 can be used by the control device 15 to receive trigger data 25 that prescribe a change of the operating state 21, that is to say prescribe a desired operating state. By way of example, the trigger data 25 can include a control command for one of the vehicle components 16.

Equally, the at least one apparatus 4 may have an event channel 26 and/or a trigger channel 27 provided by the respective data link 13. The at least one apparatus 4 can use the respective event channel 26 to signal an operating state 28 and/or a change in the operating state 28 as event data 29 to the server device 3. The respective operating state 28 can be set on the at least one apparatus 4 to a desired operating state on the basis of trigger data 30 of the server device 3. To this end, the trigger data 30 can include an actuation command, for example.

The control device 3 links a respective channel pair including an event channel and a trigger channel by using a respective linking rule 31. FIG. 1 illustrates two channel pairs 32, 33. The channel pair 32 links the event channel 26 of the building control device 6 to the trigger channel 23 of the motor vehicle 2. The channel pair 33 includes the event channel 22 of the motor vehicle 2 and the trigger channel 27 of the building control device 6.

The formation of the channel pairs 32, 33 and/or the stipulation of the linking rules 31 can be controlled by the user using an input device 34. To this end, the user can use an operator control device 35, for example a smart phone or personal computer or an infotainment system of the motor vehicle 2, to connect the input device 34, for example. To this end, the input device 34 can provide an internal page, for example, that can be controlled by using the operator control device 35 in a manner known per se, for example using an Internet browser. The user uses the operator control device 35 to produce a user input IN to stipulate the at least one linking rule 31 in the input device 34.

The remaining event channels 26 and trigger channels 27 of the at least one apparatus 4 may also each be linked via a linking rule 31 to a complementary channel, that is to say the event channel 22 or the trigger channel 23 of the motor vehicle 2.

Each linking rule 31 may be configured as an IF-THEN rule, for example.

Figure 2:
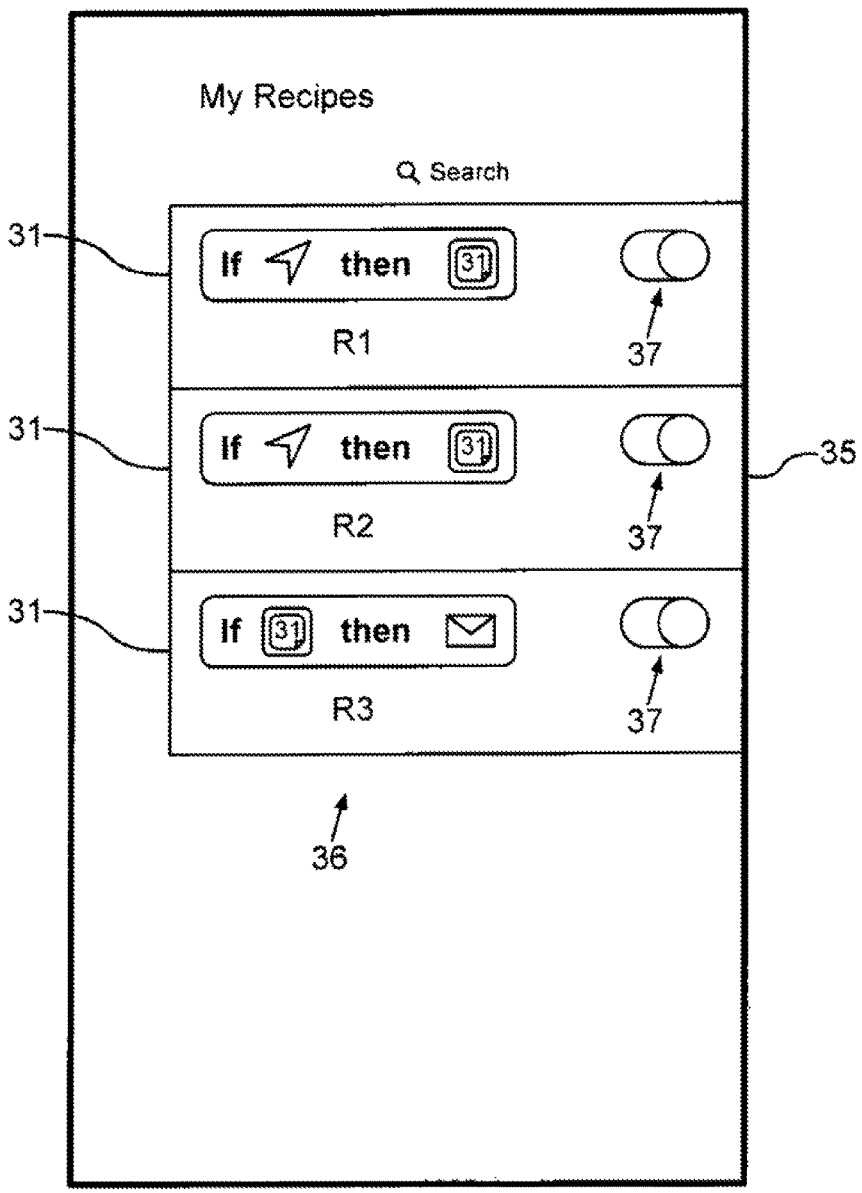
FIG. 2 is a schematic depiction of a user interface of an input device of the server device that the user can use to select at least one linking rule.

The text below refers to FIG. 2 to illustrate a user interface 36 of the operator control device 35, which can be provided as an Internet page, for example.

The user interface 36 can provide for prefabricated or prepared or stored linking rules 31 to be presented to the user for selection, which the user can activate or deactivate by using a selection element or activation element 37. A total of three linking rules R1, R2, R3 are depicted.

By way of example, linking rule R1 can state the following: "If I leave my place of work in the motor vehicle, switch my luminaire (lighting) at home in the building 7 to the green light color".

By way of example, linking rule R2 can state the following: "If I enter the area, then send a message to XY".

By way of example, linking rule R3 can, by way of example can state the following: "If an event starts in my diary (calendar), send my navigation appliance 17 the event location as a navigation destination".

Some further possible linking rules are specified by way of example below:

If a comfortable temperature is selected in the living room of the building 7, then transfer the desired temperature to my motor vehicle 2 (building control device 6). If I wake up, then start vehicle heater 18 after 50 minutes, the wakeup time being able to be detected by the monitoring device 8. If my motor vehicle 2 is still in front of the garage after 18:00 hours, then send me a notification on my smart phone 9. If I drive past attractions, for example the Allianz Arena in Munich, then load a photograph using my camera 19 onto a server with publication capabilities for social media. If the navigation routing of the navigation appliance 17 is activated over 250 km away from the building 7, then set the building control device 6 in the building 7 to absent (vacant state control). If my children call my smart phone 9 after 23:00 hours at the weekend, then send me their location on my navigation appliance 17 in the motor vehicle 2. If my wife/girlfriend/child calls me on my smart phone 9 or enquiries an enquiry by SMS (Short Message Service), for example, then send the location of the smart phone 9 to the navigation appliance 17 of the motor vehicle 2 of the wife/girlfriend/child. If my occasion information device announces a meteor shower in a radius of 80 km, then notify the smart phone 9 and send me the position of the occasion on the navigation appliance 17 of my motor vehicle 2. If I leave my place of work in the motor vehicle 2, then switch my ambient light from the appliance 11 in my living room to green. If a calendar entry is upcoming, send the location of the entry to my navigation appliance 17 of the motor vehicle 2.

FIG. 3 illustrates how, by using the input device 35, a user interface 38 can provide the driver with the opportunity to change a linking rule 31. FIG. 3 illustrates the configuration of the linking rule R1 by way of example. As event data 24, a geographical boundary 40 is stipulated as a trigger 39. The boundary 40 delimits a geographical area 41 in a road system 42, for example.

A current location 43 of the motor vehicle 2 may be inside the area 41 or outside the area 41. By way of example, the current location 43 can be ascertained by the navigation system 17, for example by using a GPS sensor. The linking rule R1 can provide for trigger data 30 to be transmitted to the at least one apparatus 4 in the event of the motor vehicle 2 crossing or going beyond the boundary 40. Those in the example of the linking rule R1 are transmitted therefore trigger data 30 with an actuation command for the light color to the building control device 6 so that the latter sets the light color. There may also be provision for the trigger data 30 transmits to the appliance control device 10 so that the latter sets the light colors of the manner described in a luminaire that the appliance 11 depicts.

Therefore, the system 1 allows the automatic setting of the operating state 21 of the motor vehicle 2 to operating states 28 of the apparatuses 4 in the surroundings and the adaptation of the operating states 28 of the at least one apparatus 4 on the basis of the operating state 21 of the motor vehicle 2.

In this case, the control device 15 of the motor vehicle 2 uses the trigger channel 23 to effectively provide interfaces at the vehicle components 16 for setting the operating state 21. The interfaces are made available publically, or with access control, on the Internet 5 by the server device 3. Therefore, the at least one apparatus 4 can access these interfaces via a respective linking rule 31. The interfaces for the individual vehicle components 16 may be realized via the trigger channel 23 in this case, for example for the following changes of state: set interior temperature, set vehicle heater timer, request vehicle position, set navigation destination and/or navigation favorite, set geographical boundary 40, and the like.

The control device 15 uses the event channel 22 to provide interfaces for signaling the operating states of the vehicle components 16 on the server device 3, these in turn being able to be processed as conditional instructions by the control device 3. The interfaces are respectively provided for the vehicle components 16, for example, so that, by way of example, the following interfaces can be obtained for signaling operating states: send vehicle position, send camera image, send the currently active navigation destination, send a boundary crossing message that signals crossing of the boundary 40.

The event channel 22 and the trigger channel 23 combine these individual interfaces. By way of example, the interfaces may be realized on the basis of a protocol that is known per se by the name iftt. The interfaces provided may be for the navigation appliance 17, the vehicle heater/air conditioning installation 18 and/or the camera 19, for example. A respective further interface may be provided for controlling a headlamp and/or a horn of the motor vehicle.

The event channel 22 and the trigger channel 23 may be routed via a backend device B that in this case uses the server device 3 to decouple from a control device 5 in this regard. There is thus provision for indirect communication between the server device 3 and the control device 5 via the backend device B. The backend device B may be a further server for the Internet. This prevents manipulation of the operating state 21 by malware.

The interfaces for the event channel 22 and the trigger channel 23 are called using IT technology standard on the Internet. They may alternatively be provided using a protocol other than the IP (Internet protocol).

The server device 3 processes the event data 24 and generated trigger data 25 on the basis of conditional instructions (IF—THEN) that are formed by the linking rules 31.

As a result, the event data 24 from the motor vehicle are processed and triggers or actuation commands are generated as trigger data 25 to the motor vehicle. The server device 3 therefore provides a piece of linking logic or control logic in order to process conditional instructions of the linking rule 31 and thereby to realize the integration of the at least one apparatus 4 and the motor vehicle 2. The automobile manufacturer of the motor vehicle 2 thus does not have to implement the complete integration of the motor vehicle 2 into the environment itself, since connections to a smart home controller or building control device 6, an ambient light, a luminaire 11, an online calendar, a smart phone 9 or a monitoring device 8 for body functions, for example, can be realized by the respective manufacturers of the at least one apparatus 4.

By virtue of the motor vehicle 2, as a receiver of the trigger data 25, providing the interfaces for the control of the vehicle components 16 by the control device 15, automated changing of the operating state 25, that is to say at the individual operating states of the vehicle components 16, is made possible. Additionally, the motor vehicle 2 can call interfaces of the at least one apparatus 4 by virtue of the motor vehicle 2 transmitting the event data 24. The motor vehicle 2 can thus be integrated into the environment using conditional instructions of the linking rules 31.

Overall, the example shows how networking of a motor vehicle with its environment can be realized.

The system also includes permanent or removable storage, such as magnetic and optical discs, RAM, ROM, etc. on which the process and data structures described herein can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for coupling an operating state of a motor vehicle to a respective operating state of at least one vehicle-external apparatus, via a server device, the at least one vehicle-external apparatus including a monitoring device to detect at least one body function of a user of the motor vehicle, the method comprising:

receiving first event data provided by the motor vehicle using at least one first event channel, the first event data describing a current operating state of the motor vehicle and/or transmitting first trigger data to the motor vehicle using at least one first trigger channel, the first trigger data used to set a desired operating state of the motor vehicle;

receiving second event data provided by the at least one vehicle-external apparatus using at least one second event channel, the second event data describing a current operating state of the at least one vehicle-external apparatus and/or transmitting second trigger data to the at least one vehicle-external apparatus using at least one second trigger channel, the second trigger data used to set a desired operating state of the at least one vehicle-external apparatus, and the at least one second event channel including a monitor event channel for communication from the monitoring device to the server device;

receiving, via an input device, an input to form at least one channel pair to couple the motor vehicle to a respective one of the at least one vehicle-external apparatuses, the at least one channel pair including the at least one first event channel and the at least one second trigger channel, and/or the at least one second event channel and the at least one first trigger channel;

receiving, via the input device, another input specifying at least one linking rule, the at least one linking rule including predetermined trigger data for a corresponding channel pair, the predetermined trigger data being transmitted via one of the at least one first trigger channel and the at least one second trigger channel via the corresponding channel pair if predetermined event data are received via one of the at least one first event channel and the at least one second event channel via the corresponding channel pair, each linking rule being realized as an if-then rule in which the IF condition describes the predetermined event data and the THEN consequence describes the predetermined trigger data, each linking rule forming a recipe for how the motor vehicle and the at least one vehicle-external apparatus are to react to one another, the at least one linking rule including a first linking rule specifying:

receiving, via the monitor event channel, body state data, and transmitting, via the first trigger channel, an actuation command to the motor vehicle based on the received body state data, the received body state data signaling a wakeup time of the user and the actuation command corresponding to a starting time of a vehicle heater of the motor vehicle, the first linking rule forming the recipe that the vehicle heater is to be started a predetermined period of time after the wakeup time of the user; and coupling the operating state of the motor vehicle and the respective operating state of the at least one vehicle-external apparatus according to the at least one linking rule.

2. The method as claimed in claim 1, wherein
the at least one vehicle-external apparatus further includes a building control device of a building, and
the at least one channel pair includes at least one building channel pair that couples the motor vehicle to the building control device of the building via the at least one linking rule.

3. The method as claimed in claim 1, wherein
the at least one vehicle-external apparatus further includes a building control device of a building,
the at least one second trigger channel includes a building trigger channel for communication from the server device to the building control device, and
the at least one linking rule further includes a second linking rule specifying:
  receiving, via the at least one first event channel, a navigation destination of a navigation appliance of the motor vehicle, and
  transmitting, via the building trigger channel, a switching command for setting an operating profile for a vacant state to the building control device if the navigation destination is further away from the building than a predetermined minimum distance.

4. The method as claimed in claim 1, wherein
the at least one vehicle-external apparatus further includes a building control device of a building,
the at least one second event channel includes a building event channel for communication from the building control device to the server device, and
the at least one linking rule further includes a second linking rule specifying:
  receiving, via the building event channel, a current desired temperature of a heating installation of the building, and
  transmitting, via the at least one first trigger channel, the current desired temperature to the motor vehicle as a target temperature of an air-conditioning system of the motor vehicle.

5. The method as claimed in claim 1, wherein
the at least one vehicle-external apparatus further includes a message reception device,
the at least one second trigger channel includes a message trigger channel for communication from the server device to the message reception device, and
the at least one linking rule further includes a second linking rule specifying:
  receiving, via the at least one first event channel, a vehicle location, and
  transmitting, via the message trigger channel, a location notification containing the vehicle location to the message reception device if the motor vehicle is at the vehicle location within a predetermined interval of time.

6. The method as claimed in claim 1, wherein
the at least one vehicle-external apparatus includes a communication device having a locating sensor to sense a location of the communication device,
the at least one second event channel includes a communication event channel for communication from the communication device to the server device, and
the at least one linking rule further includes a second linking rule specifying:
  receiving, via the communication event channel, a message, and
  transmitting, via the at least one first trigger channel, the location of the communication device to the motor vehicle as a navigation destination of the motor vehicle if the message is received within a predetermined interval of time and/or if the communication device is associated with a predetermined person.

7. The method as claimed in claim 1, wherein
the at least one vehicle-external apparatus further includes an appliance control device of an appliance,
the at least one second trigger channel includes an appliance trigger channel for communication from the server device to the appliance control device, and
the at least one linking rule further includes a second linking rule specifying:
  receiving, via the at least one first event channel, a boundary crossing message indicating whether the motor vehicle has left or entered a predetermined area, and
  transmitting, via the appliance trigger channel, an activation signal for an appliance function of the appliance to the appliance control device based on whether the boundary crossing message indicates the motor vehicle has left or entered the predetermined area.

8. A server device, comprising:
a memory to store at least one linking rule;
at least one processor configured to:
  receive first event data provided by a motor vehicle using at least one first event channel, the first event data describing a current operating state of the motor vehicle and/or transmitting first trigger data to the motor vehicle using at least one first trigger channel, the first trigger data used to set a desired operating state of the motor vehicle, and
  receive second event data provided by at least one vehicle-external apparatus using at least one second event channel, the second event data describing a current operating state of the at least one vehicle-external apparatus and/or transmitting second trigger data to the at least one vehicle-external apparatus using at least one second trigger channel, the second trigger data used to set a desired operating state of the at least one vehicle-external apparatus, and the at least one second event channel including a monitor event channel for communication from a monitoring device that detects at least one body function of a user of the motor vehicle to the server device; and
an input device to:
  receive an input to form at least one channel pair to couple the motor vehicle to a respective one of the at least one vehicle-external apparatuses, the at least one channel pair including the at least one first event channel and the at least one second trigger channel, and/or the at least one second event channel and the at least one first trigger channel, and
  receive another input to specify the at least one linking rule, the at least one linking rule including predetermined trigger data for a corresponding channel pair, the predetermined trigger data being transmitted via one of the at least one first trigger channel and the at least one second trigger channel via the corresponding channel pair if predetermined event data are received via one of the at least one first event channel and the at least one second event channel via the corresponding channel pair, each linking rule being realized as an if-then rule in which the IF condition describes the predetermined event data and the THEN consequence describes the predetermined trigger data, each linking rule forming a recipe for how the motor vehicle and the at least one vehicle-external apparatus are to react to one another, the at least one linking rule including a first linking rule specifying:
    the at least one processor is to receive, via the monitor event channel, body state data, and
    the at least one processor is to transmit, via the first trigger channel, an actuation command to the motor vehicle based on the received body state data, the received body state data signaling a wakeup time of the user and the actuation command corresponding to a starting time of a vehicle heater of the motor vehicle, the first linking rule forming the recipe that the vehicle heater is to be started a predetermined period of time after the wakeup time of the user, and
the at least one processor is further configured to couple an operating state of the motor vehicle and a respective operating state of the at least one vehicle-external apparatus according to the at least one linking rule stored in the memory.

9. The server device as claimed in claim 8, wherein
the at least one vehicle-external apparatus further includes a building control device of a building,
the at least one second trigger channel includes a building trigger channel for communication from the server device to the building control device, and
the at least one linking rule further includes a second linking rule specifying:
  the at least one processor to receive, via the at least one first event channel, a navigation destination of a navigation appliance of the motor vehicle, and
  the at least one processor to transmit, via the building trigger channel, a switching command for setting an operating profile for a vacant state to the building control device if the navigation destination is further away from the building than a predetermined minimum distance.

10. The server device as claimed in claim 8, wherein
the at least one vehicle-external apparatus further includes a building control device of a building,
the at least one second event channel includes a building event channel for communication from the building control device to the server device, and
the at least one linking rule further includes a second linking rule specifying:
  the at least one processor to receive, via the building event channel, a current desired temperature of a heating installation of the building, and
  the at least one processor to transmit, via the at least one first trigger channel, the current desired temperature to the motor vehicle as a target temperature of an air-conditioning system of the motor vehicle.

11. The server device as claimed in claim 8, wherein
the at least one vehicle-external apparatus further includes a message reception device,
the at least one second trigger channel includes a message trigger channel for communication from the server device to the message reception device, and
the at least one linking rule further includes a second linking rule specifying:
  the at least one processor to receive, via the at least one first event channel, a vehicle location, and
  the at least one processor to transmit, via the message trigger channel, a location notification containing the vehicle location to the message reception device if the motor vehicle is at the vehicle location within a predetermined interval of time.

12. The server device as claimed in claim 8, wherein
the at least one vehicle-external apparatus includes a communication device having a locating sensor to sense a location of the communication device,
the at least one second event channel includes a communication event channel for communication from the communication device to the server device, and
the at least one linking rule further includes a second linking rule specifying:
  the at least one processor to receive, via the communication event channel, a message, and
  the at least one processor to transmit, via the at least one first trigger channel, the location of the communication device to the motor vehicle as a navigation destination of the motor vehicle if the message is received within a predetermined interval of time and/or if the communication device is associated with a predetermined person.

13. The server device as claimed in claim 8, wherein
the at least one vehicle-external apparatus further includes an appliance control device of an appliance, the at least one second trigger channel includes an appliance trigger channel for communication from the server device to the appliance control device, and the at least one linking rule further includes a second linking rule specifying:

the at least one processor to receive, via the at least one first event channel, a boundary crossing message indicating whether the motor vehicle has left or entered a predetermined area, and the at least one processor to transmit, via the appliance trigger channel, an activation signal for an appliance function of the appliance to the appliance control device based on whether the boundary crossing message indicates the motor vehicle has left or entered the predetermined area.

14. The server device as claimed in claim 8, wherein the input device is configured to receive the input to form the at least one channel pair and to receive the another input to specify the at least one linking rule, via a user interface provided to an operator control device disposed remotely from the server device.

15. The server device as claimed in claim 8, wherein the at least one vehicle-external apparatus further includes a social media server, the at least one second trigger channel includes a social media trigger channel for communication from the server device to the social media server, and the at least one linking rule further includes a second linking rule specifying:

the at least one processor to receive, via the at least one first event channel, an image automatically captured by a camera of the motor vehicle at a time when a navigation system of the motor vehicle determines the motor vehicle is near a predetermined point of interest, and the at least one processor to transmit, via the social media trigger channel, the image and a command to publish the image on a social media network signal, to the social media server.

\* \* \* \* \*